Oct. 19, 1948.  B. J. AUBURN  2,451,901
CONTROL SYSTEM FOR REEL MOTORS
Filed July 13, 1946
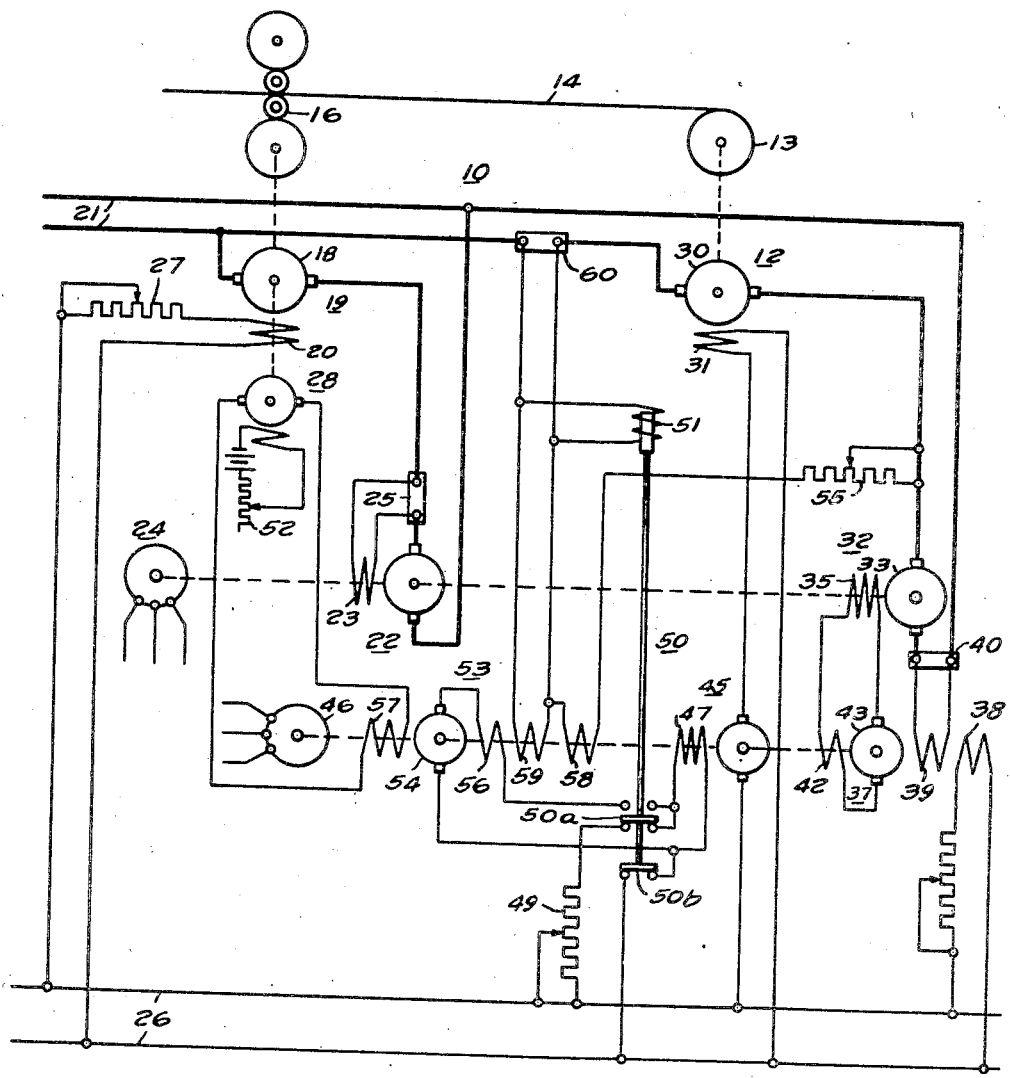
WITNESSES:
INVENTOR
Basil J. Auburn
BY
ATTORNEY Patented Oct. 19, 1948

2,451,901

UNITED STATES PATENT OFFICE 2,451,901

CONTROL SYSTEM FOR REEL MOTORS

Basil J. Auburn, Pittsburgh, Pa., assignor to Westinghouse Electric Corporation, East Pittsburgh, Pa., a corporation of Pennsylvania Application July 13, 1946, Serial No. 683,315

9 Claims. (Cl. 318—6)

My invention relates generally to control systems and it has reference in particular to reel control systems for handling strip material and the like.

Generally stated, it is an object of my invention to provide a reel control system that is simple and inexpensive to manufacture and which is reliable and efficient in operation.

More specifically, it is an object of my invention to provide for using a regulating generator of the self-energizing type for controlling the operation of a reel motor to maintain a predetermined tension in a strip of material being wound on or unwound from a reel.

It is also an object of my invention to provide for regulating the field current of a reel motor to maintain a predetermined tension in a strip of material, regardless of the diameter of the coil of material on the reel.

Another object of my invention is to provide for regulating the speed of a reel motor so that the tension in the material being handled remains substantially constant, regardless of the diameter of the coil.

It is also an important object of my invention to provide for using a regulating generator which is responsive to the speed of travel of a strip of material, the counter-electromotive force of a reel motor and the armature current thereof, for controlling the energization of the reel motor field winding.

Yet another object of my invention is to provide for utilizing the output voltage of a regulating generator of the self-energizing type for progressively varying the energization of a field winding of a reel motor to maintain a predetermined tension in a strip of material as the diameter of the coil of material on the reel changes.

Another important object of my invention is to provide a reel control system wherein the current regulating equipment is not required to operate over a wide range of current values.

A further object of my invention is to provide for varying the torque of a reel motor with the diameter of a coil of material on the reel.

Other objects will, in part, be obvious and will, in part, be explained hereinafter.

In practicing my invention in one of its forms, a booster generator is used to regulate the armature current of a reel motor so as to maintain a predetermined value thereof. The field winding of the reel motor is energized under the control of a regulating generator of the self-energizing type having a pattern field winding energized from a pilot generator driven by the motor of the rolls immediately adjacent the reel motor, a differential control field winding energized in accordance with the counter-electromotive force of the reel motor armature, and a cumulative IR drop field winding energized in accordance with the reel motor armature current.

For a more complete understanding of the nature and scope of my invention, reference may be made to the following detailed description which may be studied in connection with the accompanying drawing in which the single figure is a diagrammatic view of a reel control system.

Referring to the drawing, the reference numeral 10 may denote generally a control system for a reel motor 12 which may be connected to a reel 13 for either winding or unwinding a strip of material 14 which is being worked on by means such as the rolls 16.

The rolls 16 may be driven in any suitable manner being, for example, operatively connected to the armature 18 of a roll motor 19 having a field winding 20. The armature 18 may be connected to a variable voltage source represented by conductors 21. Means such as a booster generator 22 having a field winding 23 and driven by a motor 24 may be connected in series circuit relation with the armature 18 for varying the voltage applied thereto. The field winding 23 of the booster generator may be energized in accordance with the roll motor load, being for example, connected to a shunt 25. The field winding 20 of the roll motor 19 may be connected to a suitable source of electrical energy such as that represented by conductors 26 through a rheostat 27. A pilot generator 28 which may be driven by the motor 19 may be utilized for providing a control voltage proportional to the speed of the motor 19 and hence to the speed of travel of the strip 14.

The reel motor 12 may be provided with an armature 30 and a field winding 31. The armature 30 may be connected to the variable voltage source represented by the conductors 21. In order to provide for regulating the power delivered to the reel, means such as the booster generator 32 may be utilized. The booster generator 32 may comprise an armature 33 which may be driven by the motor 24 and connected in series circuit relation with the armature 30 of the reel motor, and a field winding 35. The field winding 35 may be energized from a current regulating generator 37 having a pattern field winding 38 energized from a source of electrical energy represented by the conductors 26, a differential control field winding 39 which may be energized in accordance with the reel motor armature current by being connected across a shunt 40 in the armature circuit of the reel motor 19 and a self-energizing field winding 42 which may be connected in series circuit relation with the armature 43 of the regulating generator and the field winding 35 of the booster generator 32.

In order to provide for maintaining a predetermined tension in the strip 14 as the strip winds on or unwinds from the reel 13, the field winding 31 of the reel motor may be connected to the source represented by conductors 26 in circuit relation with a control generator 45 having a field winding 47 and driven by a motor 46. The field winding 47 may be normally connected to the source represented by conductors 26 through a rheostat 49, moving contact members 50a and 50b and back contacts of a load responsive relay 50 having an operating winding 51. The rheostate 49 may be adjusted to provide a predetermined minimum field for effecting energization of the reel motor field winding 19 so as to run the reel motor 12 at the maximum or "empty reel" speed.

In order to provide for progressively varying the energization of the field winding 19 of the reel motor as the diameter of the coil on the reel 13 varies, means such as the regulating generator 53 may be utilized for effecting energization of the field winding 47 of the booster generator 45 during operation in accordance with the coil diameter. The regulating generator 53 may comprise an armature 54 which may be connected in series circuit relation with a series of self-energizing field winding 56 to the field winding 47 for effecting energization thereof. The regulating generator also may be provided with a pattern field winding 57 which may be connected to the pilot generator 28 so as to be energized in accordance with the speed of travel of strip 14. A rheostat 52 may be provided for varying the energization of the field winding 57 by controlling the field excitation of the pilot generator.

In this instance the regulating generator 53 is also provided with a differential or control field winding 58 and a compensating field winding 59. The differential or control field winding 58 may be connected across the armature 30 of the reel motor 12 through a rheostat 55 so as to be energized in accordance with the counter-electromotive force of the reel motor. The compensating field winding 59 which is cumulative with respect to the plattern field winding 57 is utilized for compensating for the resistance drop in the armature circuit of the reel motor. It may, for example, be connected across a shunt 60 in the circuit of the armature 30.

The operating winding 51 of the load responsive relay may also be connected across the shunt 60 for effecting transfer of the field winding 47 of the control generator 45 from the conductors 26 to the regulating generator 53 when the reel motor takes the load as the strip 14 comes under tension.

The speed of the empty reel may be matched to the delivery speed of the strip 14 by adjusting the rheostat 49. Under this condition the regulating generator 53 is disconnected from the field winding 47. As soon as the strip 14 comes under tension and the reel motor 12 picks up its load, the load responsive relay 50 operates to transfer the connection of the control generator field winding 47 from the conductors 26 to the armature 54 of the regulating generator 53. At the same time the compensating field winding 59 of the regulating generator 53 becomes more effective with the increase in armature current of the reel motor. Since this field winding 59 is cumulative with respect to the pattern field winding 57, these two should be so matched against the differential field winding 58 by adjusting the rheostats 52 and 55 as to cause the regulating generator 53 to develop an output voltage in such a direction as to maintain the speed of the reel motor 12.

As the strip 14 is wound up on the reel 13, the diameter of the coil on the reel increases so that the reel motor has a tendency to slow down under the current regulating action of the booster generator 32. Under these conditions, its counter-electromotive force drops correspondingly. This weakens the energization of the control field winding 58, so that the pattern field winding 57 and the compensating field winding 59 predominate. This causes the regulating generator to develop a voltage in such a direction as to increase the energization of the motor field winding 31 and increase its counter-electromotive force until the control field winding balances the pattern and compensating field windings. Since the diameter of the coil continues to increase, the counter-electromotive force will correspondingly tend to continue to fall and therefore, the pattern field winding 57 will always predominate, thus causing the energization of the reel motor field winding 31 to be progressively increased in order to maintain the counter-electromotive force, hence maintaining the tension of the strip substantially constant.

When my invention is applied to an uncoiling system the rheostat 49 should be adjusted for the minimum or "full reel" speed. The output of the regulating generator 53 will be adjusted to provide sufficient energization under normal tension conditions to maintain "full reel" speed. As the coil diameter decreases the speed tends to increase, and so does the counter-electromotive force. This control field predominates and the energization of the field winding 47 is reduced until the counter-electromotive force is restored at the higher speed. This action continues as the reel diameter decreases. The booster generator 32 regulates the tension as previously described.

From the above description and the accompanying drawing, it will be apparent that I have provided a simple and effective control system for a reel motor whereby the energization of the reel motor field winding is always proportional to the diameter of the coil of material on the reel. Since the torque delivered by the motor is always proportional to the coil diameter, it may therefore be utilized in measuring the tension of the strip. In a control system embodying the features of my invention, the current regulating equipment is not required to operate over a wide range as in other types of control systems, and hence more accurate results may be obtained. Since the current regulating equipment operates through a booster generator, it does not change the field flux of the reel motor and the tension of the strip may, therefore, be maintained more nearly constant than with the systems where the field flux is varied to regulate the armature current.

Since certain changes may be made in the above described construction and different embodiments of the invention may be made without departing from the scope thereof, it is intended that all of the matter contained in the above description and shown in the accompanying drawing shall be considered as illustrative and not in a limiting sense.

I claim as my invention:

1. For use in a strip handling system with a reel motor having an armature and a field winding, regulating means operable to maintain a predetermined armature current, and additional regulating means jointly responsive to the counter-electromotive force of the armature and the speed of the strip for simultaneously regulating the energization of the field winding.

2. In a control system for a motor driving a reel in a material handling system and having an armature and a field winding, regulating means operable to regulate the armature current of the motor, and independent regulating means including a regulating generator responsive to the counter-electromotive force of the motor and the speed of the strip operable to regulate the energization of the field winding.

3. In a control system for a motor connected to a material carrying reel, regulating means responsive to the motor load operable to effect predetermined control of the motor, and additional regulating means differentially responsive to the speed of the material and to the counter-electromotive force of the motor operable to vary the torque of the motor in predetermined relation to the speed of the strip and the counter-electromotive force of the motor.

4. In combination, a motor connected to a reel for strip material and having an armature and a field winding, means including a regulating device responsive to the armature current for supplying a predetermined current to the armature, and means including a regulating generator connected to energize the field winding in accordance with the speed of travel of the strip and differentially with respect to the counter-electromotive force of the reel motor armature.

5. In a control system for use with the motor of a reel for strip material arranged to be worked upon by work means and having an armature and a field winding, means including regulating means responsive to the load on the reel motor operable to effect predetermined energization of the reel motor armature, means effective to produce a control voltage responsive to the speed of the work means, and means operable to effect energization of the reel motor field winding including a regulating generator having a series field winding of the self-energizing type, a pattern field winding energized in accordance with the control voltage, and a differential control field winding energized in accordance with the counter-electromotive force of the motor armature.

6. For use with a motor having an armature and a field winding and having a driving connection with a reel for a material arranged to be worked upon by roll means, a control system comprising, means including a series connected generator connecting the armature of the reel motor to a source of electrical energy, said generator having a field winding energized in accordance with the motor armature current to maintain a predetermined value thereof, means for effecting energization of the field winding of the reel motor including a regulating generator having a pattern field winding, a differential control field winding energized in accordance with the counter-electromotive force of the reel motor armature, and an auxiliary cumulative control field winding energized in accordance with the load on the reel motor, and means responsive to the speed of the roll means energizing the pattern field winding.

7. In a reel control system for handling strip material, a motor having a driving connection with the reel and having an armature and a field winding, means including a booster generator responsive to the armature current of the motor effective to regulate the armature current of the reel motor, means including a booster generator with a field winding connecting the motor field winding to a source of electrical energy, and means including a regulating generator connected to energize the field winding of the booster generator, said regulating generator having a self-energizing field winding of the series type, a pattern field winding energized in accordance with the speed of the strip, a differential control field winding connected across the armature of the reel motor and an auxiliary cumulative field winding energized in accordance with the load on the reel motor.

8. In a control system for a reel handling strip material; a motor having an armature and a field winding connected in driving relation with the reel; means including a booster generator connecting the armature of the reel motor to a source of electrical energy, said booster generator being responsive to the armature current of the reel motor to maintain a predetermined value thereof; a regulating generator selectively responsive to the speed of the strip, the counter-electromotive force of the armature of the reel motor and the armature current thereof for producing a control voltage, means including a control generator connected to effect energization of the field winding of the reel motor; and circuit means for selectively controlling the output of the control generator in accordance with the voltage of a source of electrical energy of substantially constant voltage and the control voltage of the regulating generator.

9. In a control system for a reel for strip material worked upon by roll means driven by a roll motor; a reel motor having a driving connection with the reel and having an armature and a field winding, means connecting the armature of the reel motor to the same source of electrical energy as the roll motor including a booster generator responsive to the armature current of the reel motor to maintain said current at a predetermined value; a regulating generator having a pattern field winding energized in accordance with the speed of the roll motor, a differential field winding energized in accordance with the counter-electromotive force of the reel motor armature operable to develop a control voltage, a compensating cumulative field winding energized in accordance with the armature current of the reel motor and a self-energized series field winding arranged to maintain the output under balanced conditions; means including a control generator having a field winding and an armature connected in circuit relation with the field winding of the reel motor for effecting energization thereof; and means selectively connecting the field winding of the control generator to a source of substantially constant voltage for providing a minimum value of field excitation or to the regulating generator variably controlling the field excitation.

BASIL J. AUBURN.

REFERENCES CITED

The following references are of record in the file of this patent:

UNITED STATES PATENTS

| Number | Name | Date |
|---|---|---|
| 2,365,896 | Michel | Dec. 26, 1944 |